July 2, 1968 J. F. BLUMENFELD 3,391,236
ELECTRODE HOLDER FOR GLASS MELTING FURNACE
Filed July 6, 1965 2 Sheets-Sheet 1
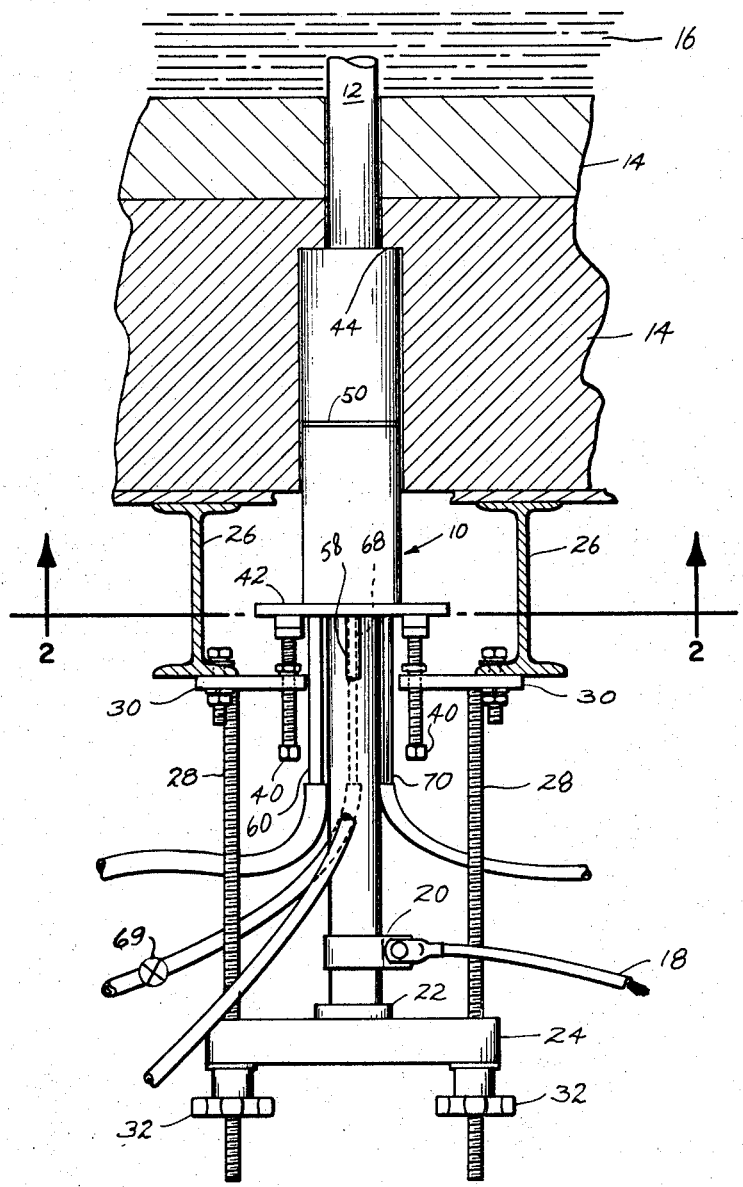
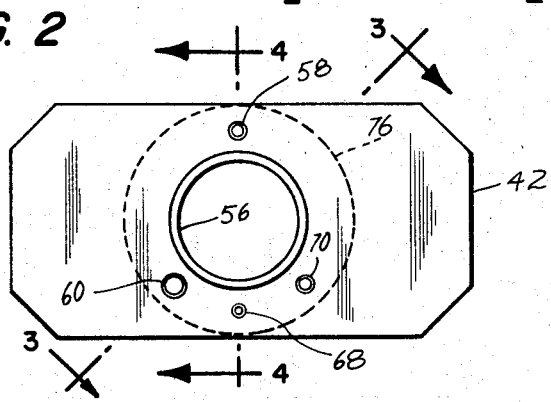
INVENTOR.
JOHN F. BLUMENFELD
BY
McCormick, Paulding & Huber
ATTORNEYS July 2, 1968   J. F. BLUMENFELD   3,391,236
ELECTRODE HOLDER FOR GLASS MELTING FURNACE
Filed July 6, 1965   2 Sheets-Sheet 2

United States Patent Office 3,391,236
Patented July 2, 1968

3,391,236
ELECTRODE HOLDER FOR GLASS
MELTING FURNACE
John F. Blumenfeld, Simsbury, Conn., assignor to Emhart Corporation, Bloomfield, Conn., a corporation of Connecticut
Filed July 6, 1965, Ser. No. 469,547
15 Claims. (Cl. 13—6)

This invention relates to electrode holders and deals more particularly with an electrode holder adapted for use with an electrode passing through the bottom wall of a glass melting furnace and comprising part of an electrical circuit for passing Joule effect heating current through the molten glass in the furnace.

Joule effect heating by the passage of electrical current through a body of molten glass is well known in the art of glass making, and is often used in a glass melting furnace either to supplement a gas or oil heating means or to provide all of the energy required for the melting and fining processes. This electrical energy is in turn often applied to the glass by means of a number of cylindrical electrodes, commonly made of molybdenum, inserted into the glass through the refractory walls of the furnace and suitably connected to a source of electrical power so as to cause electrical current to flow between the electrodes through the glass. A major problem in the use of some electrodes is their susceptibility to oxidation in the zone where they emerge from the hot furnace and are in contact with the air. To avoid rapid oxidation, it is common practice to apply some type of cooling to the electrode in this zone.

The general object of this invention is to provide an improved electrode holder for holding and cooling an electrode inserted into a body of molten glass through the bottom wall of a furnace.

A more particular object of this invention is to provide an electrode holder of the type mentioned in the foregoing paragraph wherein the cooling is achieved by a water jacket surrounding the electrode and by an upper end bushing cooled by the water in the jacket and wherein the possibility of an air pocket existing at the upper end of the jacket is eliminated, despite possible inclination of the electrode, so as to assure positive contact of the end bushing with the water.

Another object of the invention is to provide an electrode holder of the foregoing character which makes an economical use of the cooling water and wherein the danger of a sudden build up of steam pressure in the jacket, as a result of the cooling water supply being turned off, is eliminated.

Other objects and advantages of the invention will be apparent during the course of the following description and from the drawings forming a part hereof.

The drawings show a preferred embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

Of the drawings:

FIG. 1 is a sectional view taken through a glass furnace bottom wall and showing in elevation an electrode holder embodying this invention.

FIG. 2 is a bottom view of the electrode holder of FIG. 1 taken on the line 2—2 of the latter figure.

Figure 3:
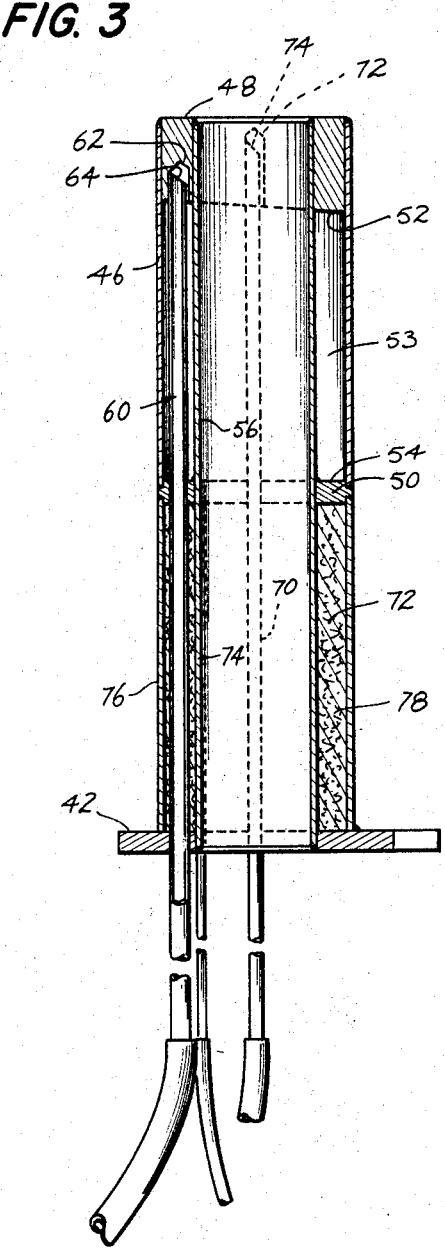
FIG. 3 is a vertical sectional view taken on the line 3—3 of FIG. 2.

Turning now to the drawings, and first considering FIG. 1, this figure at 10 shows an electrode holder embodying the present invention. The holder 10 is associated with a vertical electrode 12 which passes through the bottom refractory wall 14 of a glass melting furnace into a body 16 of molten glass contained in the furnace. As mentioned, the electrode 12 serves to heat the body of glass 16 as a result of electric currents passed through the glass between the electrode 12 and one or more similar electrodes also extending into the molten glass body.

As shown in FIG. 1, the electrode holder 10 preferably extends some distance into, but not entirely through, the bottom furnace wall 14 and also extends some distance below the wall. The electrode 12 extends downwardly beyond the bottom of the holder 10 and at its lower end is connected to an electrical supply line 18 by a suitable connecting means such as a clamp 20. The bottom end of the electrode is vertically supported by a cradle 22 of electrical insulating material which in turn is carried by a supporting member 24, the cradle 22 having a recess for receiving the lower end of the electrode and serving to insulate the electrode from the supporting member 24.

During use of the electrode 12, its upper end portion, which is exposed to the molten glass, gradually wears away, and to compensate for this erosion the electrode periodically, and as necessary, is moved vertically to bring fresh portions thereof into the furnace. To permit this vertical electrode movement, the support member 24 is connected with the fixed framework of the furnace by a suitable vertical adjustment means. The parts of the framework to which the adjusting means is connected may vary depending on the type of furnace and the location of the electrode in the furnace. In FIG. 1 the framework parts are shown by way of example to comprise two spaced I-beams 26, 26. The adjusting means for the support member 24 in turn comprises two threaded rods 28, 28 each of which at its upper end is connected to a plate 30 fixed to the lower flange of a respective one of the I-beams 26, 26. The two rods 28, 28 are located on opposite sides of the electrode 12 and pass loosely through the opposite ends of the support member 24. Below the support member 24, each rod 28 has a hand knob 32 threaded thereon which may be rotated by hand to raise or lower the support member. Therefore, by turning the knobs 32, 32 in unison, the supporting member 24 may be raised to push a fresh portion of the electrode 12 into the furnace as required to compensate for electrode erosion. If a sufficient lifting force cannot be applied to the electrode 12 to cause it to move vertically by manual force applied to the hand knobs, additional force may be applied by the use of a jack placed below the supporting member 24. The electrode also is preferably made up from threaded sections each having a threaded male stem at one end and a complementary threaded female socket at the other end thereby enabling the construction of an electrode of any desired length by the joining of a number of such sections. Thus, after the supporting member 24 is raised to a given maximum point, it may be lowered, without lowering the electrode 12, and a new electrode section joined to the bottom of the electrode.

The electrode holder 10 is also vertically supported by a suitable connection with the framework of the furnace, and in FIG. 1 this supporting means is shown, by way of example, as comprising two jack bolts 40, 40 which are threadably received in the plates 30, 30 and which at their upper ends bear against the bottom surface of a base member 42 of the electrode holder. As shown in FIG. 1, the opening which is provided in the bottom wall 14 of the furnace to accommodate the electrode and electrode holder is of a stepped shape and includes a lower portion of a diameter closely conforming to the outside diameter of the holder 10 and an upper portion having a diameter closely conforming to the outside diameter of the electrode 12, with the two portions of the opening being joined by a radial shoulder 44. By properly adjusting the jack bolts 40, 40, the upper end of the electrode holder may therefore be brought to bear against the shoulder 44. This engagement of the holder with the shoulder 44 prevents the holder from moving upwardly with the electrode as a fresh portion of the electrode is pushed into the furnace. The stepped shape of the opening in the furnace wall is not, however, necessary, and, if desired, the opening may have the same diameter along its entire length, this diameter being slightly larger than the outside diameter of the holder. In the latter case, the supporting means for the holder must additionally be capable of holding the holder against upward movement as the electrode is pushed into the furnace.

Figure 4:
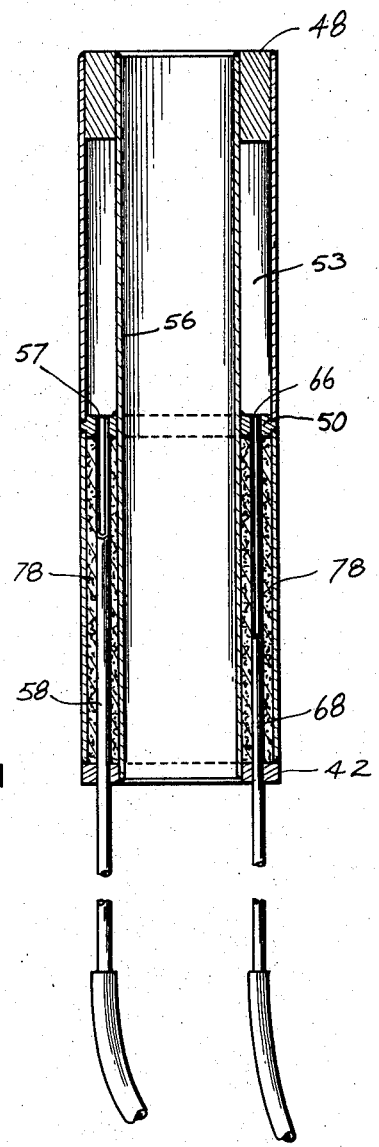
FIG. 4 is a vertical sectional view taken on the line 4—4 of FIG. 2.

Considering now FIGS. 2, 3 and 4 for a more detailed descritpion of the electrode holder 10, the holder in accordance with this invention includes a means for defining an annular chamber 53 surrounding the electrode 12 and which chamber is normally filled with cooling water. The chamber defining means includes an outer cylindrical sleeve 46, an upper end bushing 48 and a bottom ring 50. The lower end surface 52 of the bushing 48 defines the upper boundary of the chamber, the upper surface 54 of the ring 50 defines the lower boundary of the chamber and the inner surface of the sleeve 46 defines the outer boundary of the chamber. The inner boundary of the chamber may be defined by the outer surface of the electrode 12 itself, in which case a suitable seal should be provided between the ring 50 and the electrode to prevent water from running down the electrode. Preferably, and as shown, however, the holder includes an inner sleeve 56 which is concentric with and radially spaced from the outer sleeve 46 and which provides the inner boundary of the cooling water chamber. The inner sleeve 56 surrounds the electrode 12 and is of approximately the same diameter as the electrode, but with sufficient clearance existing between the electrode and the sleeve to allow the electrode to be moved vertically through the holder as required to accomplish the necessary vertical electrode adjustments. The bushing 48 is annular in shape and completely closes the space between the two sleeves 46 and 56 and the ring 50 is likewise annular in shape and completely closes the space between the two sleeves. The two sleeves 46 and 56 are also preferably of a fairly short length so that the cooling chamber 53 surrounds only a relatively short length of the electrode and provides effective cooling only in the zone where the electrode would otherwise be hot enough to result in excessive oxidation. Below this zone it is generally wasteful of cooling water to provide additional cooling.

Cooling water is admitted to the cooling water chamber 53 through the inlet port located at or near the lower end of the chamber. In the illustrated case, this port, as shown at 57, is located in the ring 50 and communicates with a cooling water supply conduit 58 which passes from a position below the holder to the ring 50 with the upper end of the conduit 58 being welded or otherwise fixed to the ring 50 in communication with the port 57.

Water which enters the cooling chamber 53 through the supply conduit 58 fills the chamber 53 and is removed therefrom by means of an overflow conduit 60 which extends into the chamber 53 and provides an overflow port located in an upwardly extending opening 62 passing partly through the bushing 48. In the illustrated example, the discharge conduit passes through and is welded leak tight to the ring 50, through the chamber 53 and into the opening 62 in the bushing with the overflow port being provided by the open end 64 of the conduit. The upper end of the conduit is spaced a substantial distance from the upper end of the opening 62 and the opening 62 is of a substantially larger diameter than the outer diameter of the conduit so as to provide adequate space between the conduit and the surface of the opening for the free flow of water from the chamber to the outlet port 64. From the above description of the relative arrangement of the cooling water inlet and overflow ports, it will be noted that the location of the overflow port 64 in the opening 62 of the bushing eliminates any possibility of an air pocket existing at the upper end of the chamber 53 and accordingly assures that the lower end surface 52 of the bushing is fully contacted by the cooling water. The maximum heat transferred between the electrode and the electrode holder occurs in the vicinity of the bushing 48 and, therefore, the full contacting of the bushing by the cooling water is important to the cooling process.

To still further assure the elimination of any air at the upper end of the chamber, the lower end surface 52 of the bushing 48 is preferably inclined relative to the axis of the holder, as shown best in FIG. 3, and the overflow opening 62 located at the high point of the surface. Therefore, any air trapped in the chamber will pass to the overflow conduit despite the fact that the electrode holder may not be installed exactly vertically in the furnace and may have a slight inclination away from vertical.

When moving the electrode 12 relative to the holder 10, the normal porcedure is to shut off the water supply so as to allow the glass in contact with the holder and electrode to thaw. The electrode is then moved to its new position and the water turned back on. During the time that the water is turned off, the water flow through the chamber 53 is stopped and the water which remains in the chamber, unless drained therefrom, will rapidly turn into steam by the absorption of heat from the electrode. This in turn may present some safety hazard by the sudden build up of steam pressure greater than can be released adequately through the overflow conduit 60. To avoid this hazard, the electrode holder 10 may include, as shown, an auxiliary discharge drain through which the water remaining in the chamber 53 may be drained when the water supply to the chamber is cut off. In the illustrated case, this auxiliary drain comprises a drain port 66 in the ring 50 and a drain conduit 68 which passes from a position below the holder to the ring 50 and which has its upper end connected to the ring 50, by welding or other suitable means, in communication with the port 66. The auxiliary drain conduit 68 may include a normally closed valve which is opened when the cooling water supply is cut off to achieve the draining of the chamber. Preferably, however, the auxiliary drain conduit 68 is continuously open to flow and is of such a size, or includes a restriction such as shown at 69 in FIG. 1, that the rate of flow therethrough is substantially less than the rate of flow normally supplied to the chamber through the supply conduit 58. For example, if in normal operation of the holder a flow of 1.0 gallon per minute is provided through the holder, the restriction 69 in the auxiliary drain conduit may be such as to permit about 0.1 gallon per minute to flow through the auxiliary drain conduit, with the other 0.9 gallon per minute flowing through the overflow drain. Then, when the supply of water to the chamber is stopped, the chamber will drain completely and automatically through the auxiliary drain conduit in about one minute, assuming the capacity of the cooling chamber 53 to be about 0.1 gallon.

The proper draining of the chamber 53 through the auxiliary drain conduit 68, as described above, requires that air be permitted to enter the chamber to replace the water being drained. This air flow into the chamber may take place through the overflow conduit 60 provided such conduit is open to the air. This, however, is not always the case. For example, the overflow conduit may be provided with a flow switch or indicator for indicating the flow through the holder and the switch or indicator may include a check valve preventing the reverse flow of air through the overflow conduit into the chamber.

To avoid reliance on the flow of air through the overflow conduit during a draining process, the holder 10, as shown in FIG. 3, may further include an air vent communicating with the upper portion of the chamber. In the illustrated holder, this air vent comprises an air vent conduit 70 which passes through the ring 50, through the chamber 53 and into an opening 72 extending upwardly partly through the bushing 48 from the lower end surface 52. The upper end of the conduit 70 is located at a lever above the upper end of the overflow conduit 68 and is open to define an air vent port 74 which is spaced some distance from the upper end of the opening 72. The conduit 70 is further of a substantially smaller outside diameter than the diameter of the opening 72 so as to allow the free flow of air from the outlet port 74 to the chamber 53. Depending on the pressure at which the cooling water is supplied to the holder, some water may also enter the air vent port 74 and flow out of the holder through the air vent conduit. This flow is generally undesirable, and the air vent conduit is, therefore, preferably of a relatively small size or includes a restriction to keep such flow to a low rate in comparison to the rate at which water is supplied to the holder.

The part of the holder containing the cooling chamber 53 is its primary part and, if desired, the holder may have its lower terminus at the ring 50. When this is the case, the lower end of the holder may also be positioned either above or below the bottom surface of the furnace wall so as to be either in or out of the furnace opening. Preferably, however, the holder extends below the ring 50 and defines a second annular chamber 72 surrounding the electrode. As shown in FIGS. 3 and 4, this second chamber 72 is formed by a second pair of sleeves 74 and 76 which are concentric and radially spaced from one another. The inner sleeve 74 is of the same diameter as the inner sleeve 56 and, as shown, the sleeve 74 may in fact be integral with the sleeve 56 so as to form a continuation or extension thereof. This construction is not, however, necessary and the two sleeves 56 and 74 could be made of initially separate parts welded to the ring 50. The outer sleeve 76 is of the same diameter as the outer sleeve 46 and at its upper end is welded to the ring 50, as is the lower end of the sleeve 46, the sleeves 46 and 76 being initially separate parts. The space between the upper ends of the sleeves 74 and 76 is closed by the ring 50 and the space between the lower ends of the sleeves 74 and 76 is at least partially closed by the base member 42.

The second annular chamber 72 does not contain any cooling water and therefore the closure provided by the base member 42 need not be water tight. The various conduits 58, 60, 68 and 70 all preferably pass through the base member 42 and through the chamber 72 to the ring 50. The chamber 72 may be left empty of anything other than air but, if desired, may be filled with a quantity of high temperature heat insulating material 78, such as Fiberfrax bulk fiber or Fiberfrax FC–25 tamping mix, both of which are materials sold under said names by The Carborundum Company. Also, at least one of the conduits passing through the base member 42 preferably has some clearance with the hole through which it passes, or else a separate vent hole is provided, to permit the air trapped in the chamber 72 to expand when heated without building up an excessive air pressure.

The invention claimed is:

1. A cooled electrode holder for use with a generally vertical electrode passing through the bottom wall of a glass melting furnace or the like, said holder comprising means providing an annular cooling water chamber surrounding a portion of the length of an electrode such as aforesaid and including a bushing at the upper end of said chamber through which said electrode passes, said bushing having a lower end surface which forms the upper boundary of said chamber and having an upwardly extending hole passing partly therethrough from said lower end surface, means providing a cooling water inlet port for said chamber spaced below said bushing, and a cooling water overflow conduit for removing cooling water from said chamber, said overflow conduit extending into said chamber and having an end portion positioned in said bushing hole and providing an overflow port, said conduit end portion being of such a size and shape relative to said bushing hole as to permit the free flow of water between said chamber and said overflow port.

2. A cooled electrode holder as defined in claim 1 further characterized by said lower end surface of said bushing being a generally planar surface inclined relative to the axis of said annular chamber, and said bushing hole being located near the high point of said end surface.

3. A cooled electrode holder as defined in claim 1 further characterized by an auxiliary drain means for said annular chamber providing a drain port located near the bottom of said chamber.

4. A cooled electrode holder as defined in claim 3 further characterized by said auxiliary drain means including means providing a continuously open flow path from said drain port and for restricting the flow through said path to a rate less than the rate at which cooling water is normally supplied to said annular chamber through said cooling water inlet port.

5. A cooled electrode holder as defined in claim 1 further characterized by an auxiliary drain means for said chamber providing a drain port located near the bottom of said chamber, said bushing having a second upwardly extending hole passing partly therethrough from said lower end surface, and an air vent conduit extending into said chamber and having an end portion positioned in said second bushing hole and providing a port, said end portion of said air vent conduit being of such a size and shape relative to said second bushing hole as to permit the free flow of air between said air vent port and said chamber, said air vent port being located at a higher level in said end bushing than said overflow port.

6. A cooled electrode holder as defined in claim 1 further characterized by said means providing an annular cooling water chamber including a sleeve surrounding said electrode and forming the radially inner boundary of said chamber.

7. A cooled electrode holder as defined in claim 1 further characterized by means providing a second annular chamber located below said cooling water chamber and surrounding another portion of the length of said electrode.

8. A cooled electrode holder as defined in claim 7 further characterized by a quantity of high temperature heat insulating material contained in said second annular chamber.

9. A cooled electrode holder for use with a generally vertical electrode passing through the bottom wall of a glass melting furnace or the like, said holder comprising two concentric vertical sleeves radially spaced from one another, an upper end bushing closing the space between the upper ends of said two sleeves and a ring located below said upper end bushing and closing the space between said two sleeves to define a closed cooling water chamber between said two sleeves and said end bushing and said ring, a cooling water supply port in said ring, a cooling water supply conduit communicating with said cooling water supply port in said ring, and an overflow conduit extending upwardly through said ring and through said chamber and partly through said bushing, said overflow conduit having an open upper end and the portion thereof which extends into said bushing being of such a size and shape as to permit the free flow of water from said chamber to said open upper end.

10. A cooled electrode holder as defined in claim 9 further characterized by an auxiliary drain port in said ring, and a drain conduit communicating with said auxiliary drain port.

11. A cooled electrode holder as defined in claim 10 further characterized by an air vent conduit extending axially through said ring and through said chamber and partly through said bushing, said air vent conduit having an open upper end and the portion thereof which extends into said bushing being of such a size and shape as to permit the free flow of air between said chamber and said open upper end.

12. A cooled electrode holder as defined in claim 11 further characterized by means providing a restriction in said drain conduit to limit the rate of flow therethrough to a value less than the rate of flow normally supplied to said chamber through said cooling water supply conduit.

13. A cooled electrode holder as defined in claim 9 further characterized by a second pair of concentric and radially spaced sleeves located below and concentric with said first two sleeves, said second pair of sleeves having the space between their upper ends closed by said ring, and a base member connected to the bottom ends of said second pair of sleeves and at least partially closing the space therebetween to define a second annular chamber, said overflow conduit and said cooling water supply conduit passing upwardly through said base member and through said second chamber to said ring.

14. A cooled electrode holder as defined in claim 13 further characterized by a quantity of high temperature heat insulating material in said second chamber.

15. A cooled electrode holder as defined in claim 13 wherein the inner sleeve of said second pair of sleeves is integral with and forms an axial extension of the inner one of the first two sleeves, and the two outer sleeves are parts which are initially separate from one another and welded to said ring.

References Cited

UNITED STATES PATENTS

| | | | |
|---|---|---|---|
| 1,542,716 | 6/1925 | Payne | 13—15 |
| 2,693,498 | 11/1954 | Penberthy | 13—6 X |
| 2,736,759 | 2/1956 | Penberthy | 13—6 X |
| 2,802,041 | 8/1957 | Bramlett et al. | 13—6 X |
| 2,908,738 | 10/1959 | Rough | 13—6 X |

BERNARD A. GILHEANY, *Primary Examiner.*

H. B. GILSON, *Assistant Examiner.*